United States Patent
Lu et al.

(10) Patent No.: US 10,766,399 B2
(45) Date of Patent: Sep. 8, 2020

(54) HEADLIGHT SYSTEM FOR A VEHICLE

(71) Applicant: Lumileds LLC, San Jose, CA (US)

(72) Inventors: Kang Lu, Shanghai (CN); Ping Wu, Shanghai (CN); Meng Han, Shanghai (CN); Huayun Feng, Changzhou (CN); Yiwen Lu, Shanghai (CN)

(73) Assignee: LUMILEDS LLC, San Jose, CA (US)

( * ) Notice: Subject to any disclaimer, the term of this patent is extended or adjusted under 35 U.S.C. 154(b) by 0 days.

(21) Appl. No.: 16/606,651

(22) PCT Filed: Apr. 18, 2018

(86) PCT No.: PCT/EP2018/059884
§ 371 (c)(1),
(2) Date: Oct. 18, 2019

(87) PCT Pub. No.: WO2018/192963
PCT Pub. Date: Oct. 25, 2018

(65) Prior Publication Data
US 2020/0047660 A1 Feb. 13, 2020

(30) Foreign Application Priority Data

Apr. 19, 2017 (WO) ............... PCT/CN2017/081053
May 16, 2017 (EP) .................................... 17171367
Nov. 10, 2017 (WO) ............... PCT/CN2017/110464

(51) Int. Cl.
*B60Q 1/00* (2006.01)
*F21S 41/365* (2018.01)
(Continued)

(52) U.S. Cl.
CPC .......... *B60Q 1/0058* (2013.01); *F21S 41/143* (2018.01); *F21S 41/148* (2018.01);
(Continued)

(58) Field of Classification Search
CPC ........ F21S 41/143; F21S 41/148; F21S 41/24; F21S 41/285; B60Q 1/0058
See application file for complete search history.

(56) References Cited

U.S. PATENT DOCUMENTS 9,157,595 B2 * 10/2015 Hager ................... F21S 41/30
10,363,860 B2 * 7/2019 Suwa ................... F21S 41/147
(Continued)

FOREIGN PATENT DOCUMENTS

CN 105570794 A 5/2016
DE 102010046021 A1 3/2012
(Continued)

OTHER PUBLICATIONS

Machine translation of "Brendle et al.", DE 102010046021A1, published Mar. 22, 2012 (Year: 2012).*
(Continued)

*Primary Examiner* — William N Harris

(57) ABSTRACT

A front-lighting system for a vehicle has: a first light source, a second light source, a first primary optics, a second primary optics, a transparent shutter, and a secondary optics. The first primary optics receives light from the first light source and projects it onto the transparent shutter and the secondary optics. The second primary optics receives light from the second light source and projects it onto the transparent shutter. The transparent shutter receives light from the first primary optics and prevents a lower part of it from entering the secondary optics, receives light from the second primary optics and projects it onto the secondary optics, and has a light out-coupling surface and micro-optical structures on a bordering surface. The secondary optics receives light from the first primary optics and the transparent shutter, and projects it onto a road in front of the vehicle.

14 Claims, 4 Drawing Sheets

(51) Int. Cl.
  *F21S 41/143* (2018.01)
  *F21S 41/255* (2018.01)
  *F21S 41/148* (2018.01)
  *F21S 41/20* (2018.01)
  *F21S 41/24* (2018.01)
  *F21W 102/13* (2018.01)

(52) U.S. Cl.
  CPC ............ *F21S 41/24* (2018.01); *F21S 41/255* (2018.01); *F21S 41/285* (2018.01); *F21S 41/365* (2018.01); *F21W 2102/13* (2018.01)

(56) References Cited

U.S. PATENT DOCUMENTS

| | | | | |
|---|---|---|---|---|
| 2005/0068787 | A1* | 3/2005 | Ishida | F21S 41/147 362/538 |
| 2010/0226142 | A1* | 9/2010 | Brendle | F21S 41/683 362/512 |
| 2012/0262935 | A1* | 10/2012 | Yamamoto | F21S 41/147 362/516 |
| 2014/0016343 | A1 | 1/2014 | Brendle | |
| 2016/0040848 | A1 | 2/2016 | Tsukamoto | |
| 2017/0350568 | A1* | 12/2017 | Hager | F21S 41/153 |

FOREIGN PATENT DOCUMENTS

| | | |
|---|---|---|
| DE | 102011013211 A1 | 9/2012 |
| DE | 102015215200 A1 | 2/2016 |
| EP | 2390561 B1 | 1/2018 |
| JP | 2003257222 A | 9/2003 |
| JP | 2014107048 A | 6/2014 |
| JP | 2014120342 A | 6/2014 |
| WO | 2012034936 A1 | 3/2012 |
| WO | 2013075157 A1 | 5/2013 |

OTHER PUBLICATIONS

EPO as ISA, PCT/EP2018/059884 filed Apr. 18, 2018, "International Search Report and Written Opinion", dated Aug. 3, 2018, 14 pages.

Extended European Search Report dated Nov. 24, 2017 for European Patent Application No. 17171367.0, 7 pages.

\* cited by examiner

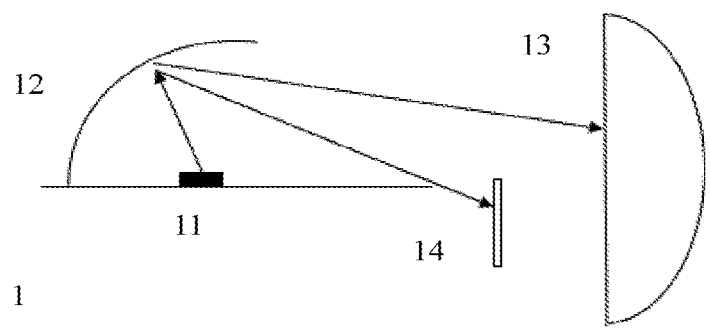
Fig. 1  --Prior Art--
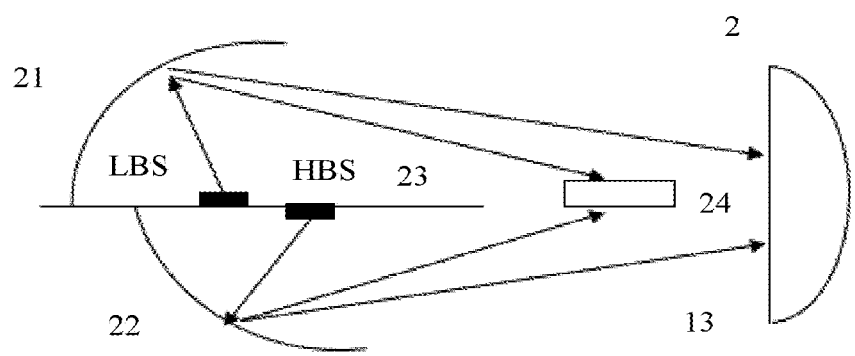
Fig. 2  --Prior Art--
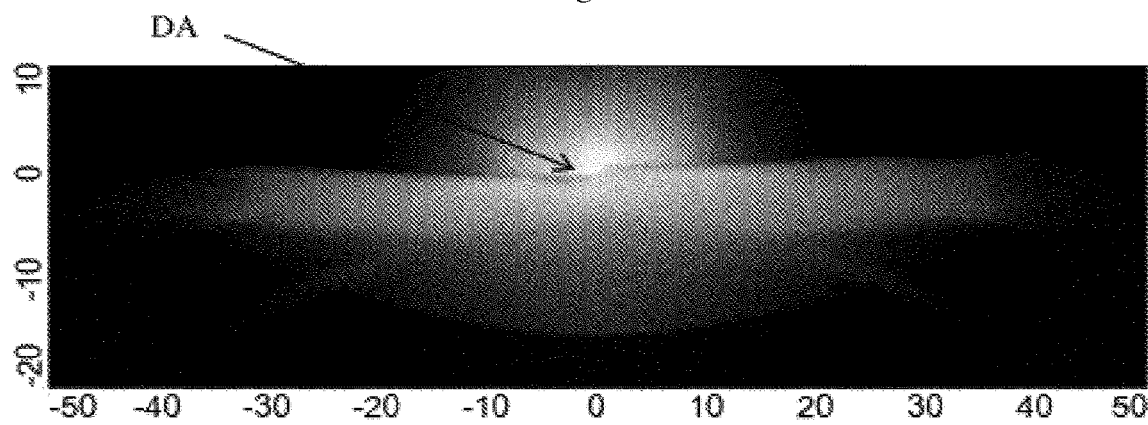
Fig. 3  --Prior Art--

HEADLIGHT SYSTEM FOR A VEHICLE

CROSS-REFERENCE TO RELATED APPLICATIONS

The present application is a § 371 application of International Application No. PCT/EP/2018/059884 filed on Apr. 18, 2018 and titled "HEADLIGHT SYSTEM FOR A VEHICLE," which claims the benefit of International Patent Application No. PCT/CN2017/081053 filed on Apr. 19, 2017 and European Application No. 17171367.0 filed on May 16, 2017 and International Application No. PCT/CN2017/110464 filed on Nov. 10, 2017. International Application No. PCT/EP2018/059884 and International Application No. PCT/CN2017/081053 and European Patent Application No. 17171367.0 and International Application No. PCT/CN2017/110464 are incorporated herein.

FIELD OF THE INVENTION

The present invention relates to the field of automotive front-lighting, and particularly to a front-lighting system for a vehicle.

BACKGROUND OF THE INVENTION

Bi-function Poly-Ellipsoidal System (PES) solution for a headlamp has been widely used in automotive lighting today. Generally speaking, an opaque shutter is utilized to enable switching between a high beam (also known as an upper beam) and a low beam (also known as a lower beam). There are several main approaches to realize such a shutter function. Two most common examples are discussed as follows.

In a first category of examples, a moveable shutter is adopted. As shown in FIG. 1, the front-lighting system 1 in this case may comprise a LED 11, a reflector 12, a projection lens 13 and a moveable shutter 14. Here, LED 11 serves as a common light source for both high beam and low beam. Specifically, the moveable shutter 14 is configured to switch between the low beam and the full high beam. Traditionally, in this kind of moveable shutter solution, a solenoid valve is needed to control the moveable shutter 14, which is not cost-effective.

In a second category of examples, a fixed shutter 24 is used, see details in FIG. 2. In addition to a projection lens 13 as in FIG. 1, two different light sources for the high and low beams (i.e., the low-beam light source LBS and the high-beam light source HBS) as well as their corresponding reflectors (i.e., 21 and 22) are also provided respectively in the front-lighting system 2. To be specific, the high-beam and the low-beam light sources LBS, HBS can be installed back-to-back in one holder 23. In view of this, the two light sources LBS, HBS will be very close, and the space between them is not enough to dissipate the heat away, which they produce aside of the light. Therefore, active cooling measures are usually required in such a situation. Besides, due to a thickness of the shutter 24 itself, a dark area DA exists in the final projected beam pattern which is clearly visible in FIG. 3. Additionally, a non-uniform color caused by dispersion is often easy to see in this case.

CN105570794A disclosed a condenser in front of the high-beam light source which condenser is further arranged to shade a small part of the light rays of the low-beam light source, i.e., to avoid, by refraction and total internal reflection within the condenser, this small part entering the projection lens.

SUMMARY OF THE INVENTION

The present invention provides a front-lighting system for a vehicle, so as to eliminate or at least alleviate one or more of the above mentioned disadvantages.

According to the present invention, a front-lighting system for a vehicle is proposed. The front-lighting system comprises a first light source, a second light source, a first primary optics, a second primary optics, a transparent shutter, and a secondary optics. Preferably, the first light source comprises a low-beam light source and the second light source comprises a high-beam light source, and vice versa. This means that two separate light sources are used respectively for the high beam and low beam.

Specifically, the first primary optics is designed to receive light from the first light source and project it onto the transparent shutter and the secondary optics. As an example, the first primary optics can be selected as a first reflector and/or comprise a reflective light in-coupling surface. Alternatively, a first collimator may also be used, and/or a refractive light in-coupling surface may be comprised in the first primary optics. In case the first primary optics is designed to be a first collimator, not only a projection of light from the first light source onto the transparent shutter and the secondary optics can be achieved, but also a beam shaping of this same light will be obtained. Also, the refractive light in-coupling surface of the first primary optics can be further configured for near field focusing other than collimation.

In the same way, a second primary optics is provided, which is designed to receive light from the second light source and project it onto the transparent shutter. Again, this second primary optics can be chosen as a second reflector or a second collimator. Specifically, the second reflector is configured to reflect the light emitted from the second light source towards the transparent shutter. As for the second collimator, it is arranged for collimating the light emitted from the second light source towards the transparent shutter. In other words, the second reflector and collimator herein are used to do preliminary processing on the light emitted from the second light source prior to entering the transparent shutter. Besides, the second collimator also helps to shape the light beam emitted from the second light source. In a particular embodiment, the second collimator might also be integrated within the transparent shutter on its entrance side facing the second light source. Similar to the first primary optics, the second primary optics may also comprise a light in-coupling surface, especially, a reflective or refractive light in-coupling surface. In this case, not only a projection of light from the second light source can be obtained, but also collimation or near field focusing of this same light will be achieved.

Additionally, the transparent shutter is designed to receive light from the first light source via the first primary optics and prevent a lower part of it from entering the secondary optics. In this case, the lower part of light from the first light source will not form any image through the secondary optics, and only the upper part of it can go into the secondary optics, thus for example forming a low beam pattern with a clear cut-off line if the first light source is chosen as a low-beam light source. Further, with regard to the second beam portion emitted from the second light source, the transparent shutter is designed to receive it via the second primary optics and project it onto the secondary optics. In combination with the secondary optics, a second beam pattern, such as a high beam pattern if the second light source is selected to be a high-beam light source, can be projected onto a road.

In an optional embodiment of the above proposed front-lighting system, the transparent shutter comprises different optical surfaces, especially comprises a surface where light emitted from the first light source and light emitted from the second light source are incident on opposite sides thereof. Preferably, this special surface is flat or in a free form. With such a flat or freeform surface comprised in the transparent shutter, light coming from the two sources can be both focused in a flexible and controllable way, especially into different focal points.

As part of the invention, the transparent shutter also comprises a light out-coupling surface, at which light is out-coupled towards the secondary optics. The light out-coupling surface is designed to be flat or in a free form, thus allowing change in an out-coupling angle and distribution of the output light. The transparent shutter further also comprises micro-optical surfaces adjacent to the above mentioned light out-coupling surface. With these micro-optical surfaces such as tooth-like surfaces included, light that would be otherwise total-internally reflected and got lost within the transparent shutter becomes capable of being refracted towards the secondary optics, thus improving the usage of light.

Specifically, the secondary optics is designed to receive light from both the first primary optics and the transparent shutter, and project it onto the road in front of the vehicle. As an optional instance, a projection lens can be used as the secondary optics.

Within the above proposed front-lighting system for a vehicle, a transparent, and further optionally fixed, shutter is used, which will lead to no shading of the light transmission. Besides, through a suppression action on a lower part of light from the first light source by the transparent shutter, a clear cut-off line can be created in the final projected low beam pattern. In this case, the dark area between the two beams, such as the high beam and the low beam, caused by any normal opaque shutter can be avoided.

In a preferred embodiment of the above indicated front-lighting system for a vehicle, the transparent shutter is further designed to refract the lower part of the light received from the first light source via the first primary optics away from the secondary optics. That is to say, the lower part of light from the first light source, especially from the low-beam source, is prevented from entering the secondary optics (such as a projection lens) through refraction by the transparent shutter. In this case, only an upper part of it is allowed to enter the projection lens and contribute to form the final projected low beam pattern. In the end, the refracted lower part may be possibly absorbed within the optical system.

According to another embodiment of the above front-lighting system, the transparent shutter is further designed to project the light received from the second light source via the second primary optics onto the secondary optics through total internal reflection. A total internal reflection in the transparent shutter helps to fold the light path, so as to keep the first light source and the second light source, such as the low-beam light source and the high-beam light source, away from each other within the whole system. For example, the high-beam light source and the low-beam light source can be located at a distance larger than 20 mm in the system. Obviously, any other different distances may be suitable based on different practices. Further optionally, the spacing between the low-beam light source and the high-beam light source, when mounted in the vehicle, is larger in a horizontal direction than in a vertical direction. In this way, the heat dissipation feasibility can be improved, and the color non-uniformity of the final beam pattern can also be lowered down. As a further preferable instance, the total internal reflection can occur one or more times in the transparent shutter, which facilitates a further reduction in the light path. In this way, one or more of the horizontal or vertical spaces of the front-lighting system can be shortened, and the whole system will become more compact.

In an exemplary embodiment of the above front-lighting system, the first light source is placed in a first focal plane of the first primary optics, and the second light source is placed in a first focal plane of the second primary optics. Besides, the transparent shutter is placed in one or more of: a second focal plane of the first primary optics, a second focal plane of the second primary optics, and a focal plane of the secondary optics, especially in all these three focal planes at the same time. Preferably, the transparent shutter is placed in the focal points of these focal planes. Apparently, those skilled in the art, having benefited from teachings of the present invention, can conceive a further positioning for various components, such as the first primary optics, the second primary optics, the secondary optics, the transparent shutter, and the two light sources, in the front-lighting system. The present invention should not be limited to those dispositions in respective focal planes or focal points.

Based on the above teachings of the present invention, those skilled in the art will easily obtain different materials or manufacturing or processing processes suitable for the transparent shutter as indicated above, and the present invention should not be limited in this regard. In an exemplary implementation, the transparent shutter in the above proposed front-lighting system can be manufactured by injection molding as a single plastic component. Obviously, this is just disclosed as an example and the present invention is not restricted to it. In addition, the transparent shutter in the above indicated front-lighting system can also be designed to have a plate shape or a curved shape, as long as the associated optical function can be accomplished. Again, the present invention should not be limited in this respect. For example, a focal length of the secondary optics, especially the projection lens, ranges from 30 mm to 80 mm. Different values other than the above indicated range could also be suitable according to different practices and technical needs.

It will be appreciated by those skilled in the art that two or more of the above disclosed embodiments, implementations and/or aspects of the present invention may be combined in any way deemed useful. Different modifications and variations of the front-lighting system for a vehicle can be carried out by a person skilled in the art on the basis of the present disclosure.

BRIEF DESCRIPTION OF THE DRAWINGS

These and other aspects of the present invention will be described now in more detail, with reference to the appended drawings showing embodiments and forming a part of the present invention. Specifically, in the drawings:

FIG. 1 schematically illustrates an existing front-lighting system for a vehicle, where a moveable opaque shutter is used;

FIG. 2 schematically illustrates another existing front-lighting system for a vehicle, where a fixed opaque shutter is used;

FIG. 3 schematically illustrates a simulated light beam pattern using the front-lighting system as shown in FIG. 2, where a clearly visible dark area can be seen;

DETAILED DESCRIPTION OF THE EMBODIMENTS

Figure 4:
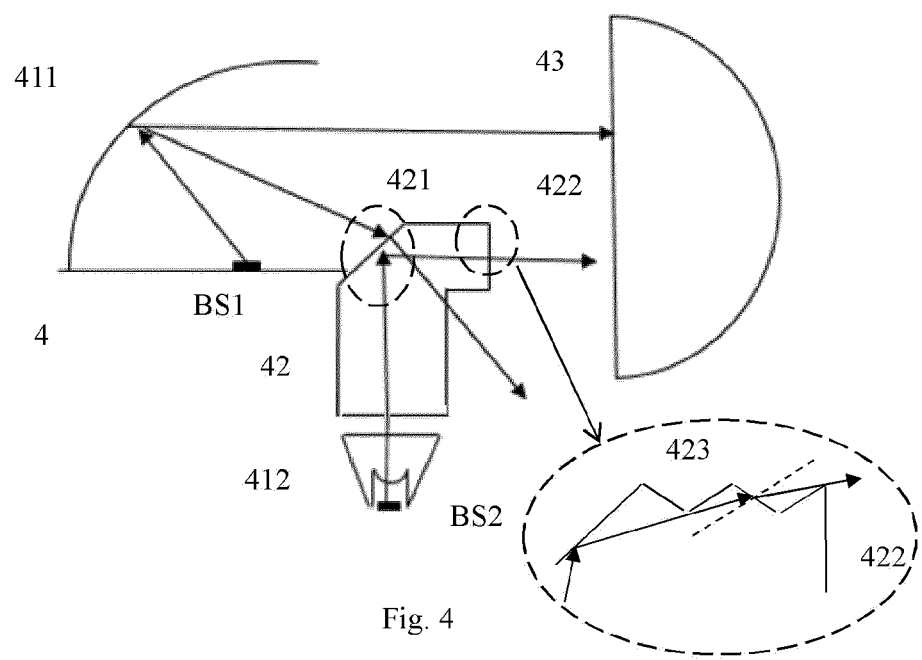
FIG. 4 schematically illustrates a front-lighting system for a vehicle according to an embodiment of the present invention, where the front-lighting system comprises a transparent shutter and an enlarged view is also included to show in more detail the micro-optical surfaces adjacent to the light out-coupling surface of the transparent shutter.

While this invention is susceptible of embodiments in many different forms, there is shown in the drawings and will be described in detail herein one or more specific embodiments, with the understanding that the present description is to be considered as exemplary of the basic principle of the present invention and not intended to limit the present invention to the specific embodiments shown and described herein.

It should be noted that various components in different figures are not drawn to scale. Besides, relative positions between individual elements shown in the figures are only used to illustrate the basic principle of the present invention and should not be considered to limit the scope of the present invention.

As discussed in the background section and shown in FIGS. 1-2, an opaque shutter 14, 24 is usually used in the traditional front-lighting systems 1, 2 of a vehicle. This opaque shutter 14, 24 tends to cause a dark area (see DA in FIG. 3) in the final projected beam pattern. Besides, in these conventional front-lighting systems 1, 2, it is also easy to see a non-uniform color, which is caused by dispersion.

With reference to FIG. 4, a front-lighting system for a vehicle is proposed according to an embodiment of the present invention. Specifically, the front-lighting system 4 mainly comprises a first light source BS1, a second light source BS2, a first primary optics 411, a second primary optics 412, a transparent shutter 42, and a secondary optics 43. Preferably, in the above proposed front-lighting system 4, the first light source BS1 is configured to provide a low-beam pattern, i.e., acting as a low-beam light source, and in the meanwhile, the second light source BS2 is configured to provide a high-beam pattern, i.e., acting as a high-beam source. Alternatively, it could also be the other way around. That is, the low-beam pattern is provided by the second light source BS2, and the first light source BS1 is used as the high-beam light source. In the specific embodiment as shown by FIG. 4, the first primary optics 411 is chosen as a first reflector, the second primary optics 412 is a second collimator, and the secondary optics 43 is selected as a projection lens. Furthermore, the first light source BS1 is now positioned in a focal plane, especially in a focal point, of the first primary reflector, and the transparent shutter 42 is located in another focal plane, especially in another focal point, of this same first primary reflector. Obviously, this special arrangement of the first light source BS1 and the transparent shutter 42 with respect to focal points of the first primary reflector is just disclosed as specific examples, for the purpose of explaining the basic principle of the present invention. Those skilled in the art, having benefited from the teaching of the present invention, will find it easy to acquire some other alternatives. In a similar way, the second light source BS2 can also be positioned in a focal plane, especially in a focal point, of the second primary optics 412, and the transparent shutter 42 is positioned in another focal plane, especially in another focal point, of the second primary optics 412. Additionally, the transparent shutter 42 itself can also be located in a focal plane, especially a focal point, of the secondary optics 43. Again, this special positioning in a corresponding focal plane or focal point should not be interpreted to be limiting.

In the specific embodiment as shown by FIG. 4, the first primary optics 411, i.e., the first reflector (also indicated as the first primary reflector), is configured to receive light from the first light source BS1, and then project part of it onto the transparent shutter 42 and part of it onto the secondary optics 43. With regard to the part of first light projected onto the transparent shutter 42 by the first primary reflector, a lower portion of it will be prevented from entering the projection lens. Especially, as shown in FIG. 4, a lower part of the received light from the first light source BS1 via the first primary optics 411 is refracted away from the secondary optics 43, and at the end possibly absorbed elsewhere within the system. In this case, the lower part of light from the first light source BS1 via the first primary optics 411 will not form any image through the secondary optics 43. Specially, in case that the first light source BS1 is configured to be a low-beam light source, only the upper part of light emitted by the low-beam light source can pass through the projection lens, thus forming a low beam pattern with a clear cut-off line.

Further, discussions relevant with the other beam portion, the one emitted by the second light source BS2, are provided in the following. With continued reference to FIG. 4, the transparent shutter 42 is also configured to receive light from the second light source BS2 via the second primary optics 412 and project it onto the secondary optics 43. In particular, the second light rays can be projected onto the secondary optics 43 horizontally. In this case, the projection of light from the second light source BS2 (received via the second primary optics 412) onto the secondary optics 43 is obtained by means of a total internal reflection within the transparent shutter 42. Optionally, the total internal reflection can occur only once within the transparent shutter 42, as shown in FIG. 4. After the total internal reflection, a second beam pattern, such as a high beam pattern if the second light source BS2 is configured as a high-beam light source, will be projected onto a road in front of the vehicle by the secondary optics 43. Again, in an optional instance, a projection lens can be used as the secondary optics 43, but the present invention is not limited to it.

Figure 5:
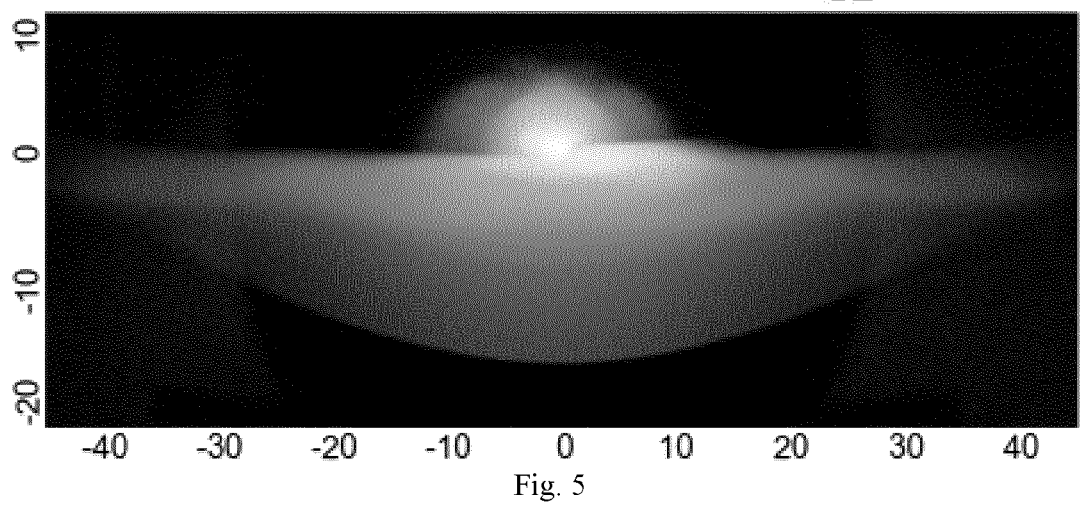
FIG. 5 schematically illustrates a simulated light beam pattern using the front-lighting system as shown in FIG. 4, where no dark area is discernible.

With a transparent shutter 42 incorporated into a front-lighting system 4 for a vehicle, the traditional opaque shutter is replaced and no dark area will be observed in the final projected beam pattern. This result is clearly depicted in FIG. 5, where no dark area exists between the first beam pattern and the second beam pattern, preferably between the high beam pattern and the low beam pattern. This is definitely distinguished from the beam pattern obtained by an existing headlamp with an opaque shutter equipped, which is illustrated in FIG. 3. This means that a clear cut-off line is formed in the projected low beam pattern without any shading.

Figure 6:
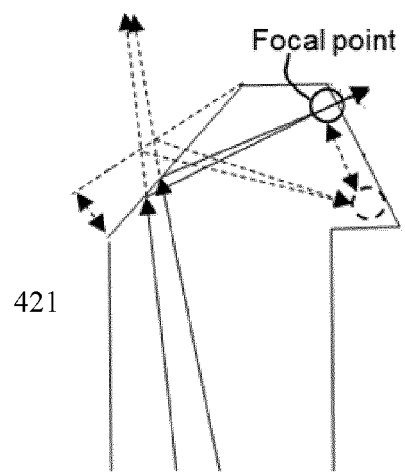
FIG. 6 schematically illustrates how a flat surface of the transparent shutter in the front-lighting system as shown in FIG. 4 influences the focus of light in different positions.

With continued reference to FIG. 4, in the above proposed front-lighting system 4, the transparent shutter 42 comprises different optical surfaces, such a surface 421 where light emitted from the first light source BS1 and light emitted from the second light source BS2 are incident on opposite sides thereof. As shown in FIG. 4, light coming from the first light source BS1 impinges on a left side of the surface 421, while light originating from the second light source BS2 is incident on a right side of the surface 421. Preferably, the surface 421 is configured to be a flat surface, as shown schematically by a straight line in the cross section view of FIG. 4. Alternatively, the surface 421 could also be a freeform surface. Apparently, other different shapes other than the flat or freeform one as listed above are also suitable for the surface 421, as long as light will be focused by means of it, especially focused towards a light out-coupling window of the transparent shutter 42. Such a focusing effect of light by the surface 421 is schematically shown in FIG. 6, where two different positions for the surface 421 are indicated by solid and dashed lines respectively. As can been seen from FIG. 6, different focal points will be obtained for the same incident light beam, if the flat surface 421 is disposed in different positions, such as tilted at different angles as in FIG. 6. In this way, light can be focused into different places by positioning the surface 421, which helps to provide an output light beam in a desired direction. It should be noted that, although only the light to be reflected by the surface 421 (that is, the light coming from the second light source BS2 in FIG. 4) is shown in FIG. 6 for the purpose of illustration, the same concept works for the light that is to be refracted by the surface 421, i.e., the light reflected by the first reflector 411 as shown in FIG. 4, and the detailed description is not repeated in this aspect.

As part of the invention, as also shown in FIG. 4, the transparent shutter 42 in the above proposed front-lighting system 4 also comprises a light out-coupling surface 422, at which light is out-coupled towards the secondary optics 43. The light out-coupling surface 422 is designed to be flat or in a free form, which helps to change the out-coupled light in angle and distribution. As well, in the front-lighting system 4, the transparent shutter 42 can also comprise micro-optical surfaces 423 adjacent to the above mentioned light out-coupling surface 422, see detail in the enlarged view of FIG. 4. Preferably, the micro-optical surfaces 423 are in a shape of tooth. With for example reference to the light out-coupling surface 422 as indicated by a dashed circle in FIG. 4, if surfaces around the surface 422 are flat with no micro structure, light incident thereon with larger angles will undergo the effect of total internal reflection, and is likely to get lost within the transparent shutter 42 in the end. This definitely results in waste of light. On the contrary, with reference to the enlarged view in FIG. 4, if a tooth-shaped surface 423 is adopted adjacent to the light out-coupling surface 422, the part of light, which would be otherwise total-internally reflected due to a larger incident angle, will be refracted towards the secondary optics 43 again. In this way, the utilization of light, such as that emitted from the first light source BS1 or the second light source BS2, is improved, and also, a further optimization of the dark area between the two light beams (i.e., the low beam and the high beam) is enabled. It should be noted that in the above description, the shape of tooth is only used to be illustrative, and apparently, the present invention shall never be limited to it. In fact, any suitable geometry can be used for the micro-optical surfaces 423 around the light out-coupling surface 422, as long as the effect of total internal reflection is at least partially destroyed, and the dark area between the low and high beams is further optimized.

Figure 7:
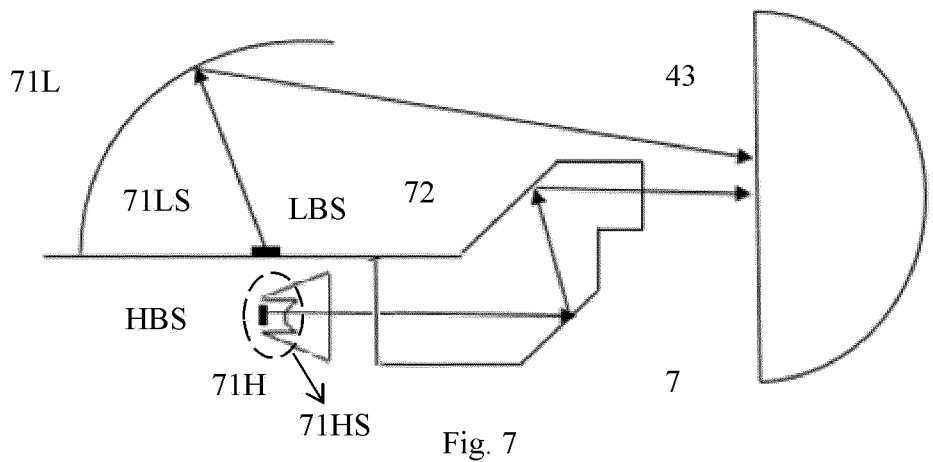
FIG. 7 schematically illustrates a front-lighting system for a vehicle according to another embodiment of the present invention, where the front-lighting system comprises a low-beam reflector and a highbeam collimator, the low-beam reflector including a reflective light in-coupling surface and the high-beam collimator including a refractive light in-coupling surface.

FIG. 7 schematically illustrates a front-lighting system 7 for a vehicle according to another embodiment of the present invention. Components and their arrangement in FIG. 7 basically stay the same as that in FIG. 4, and thus the same reference numerals are used to indicate the same components, such as the secondary optics 43. The difference is that here in FIG. 7, the first light source BS1 is specified to be a low-beam light source LBS, and correspondingly, the second light source BS2 is a high-beam light source HBS. Based on a similar consideration, the first primary optics 411 is chosen as a low-beam primary optics 71L, especially, a low-beam primary reflector, and the second primary optics 422 is selected to be a high-beam primary optics 71H, especially, a high-beam primary collimator. Further, another difference between FIGS. 4 and 6 lies in the transparent shutter. Different from the transparent shutter 42 in FIG. 4, the transparent shutter 72 in FIG. 7 enables the total internal reflection to occur twice, not only once. That is to say, light emitted from the high-beam light source HBS and collimated by the second collimator is total-internally reflected two times inside the transparent shutter 72, and then finally projected onto the secondary optics 43. Apparently, the total internal reflection can also occur more than two times. By means of multiple times of total internal reflection, the high-beam light source HBS can now be installed at the same side as the low-beam light source LBS. That is to say, a vertical distance between the two light sources can be greatly reduced, and the large spacing is mainly achieved through a horizontal distance between them. In this way, a vertical space of the front-lighting system 7 will be shortened significantly, and thus the whole system 7 becomes very compact at least in vertical direction. Besides, with multiple times of total internal reflection, the light path within the front-lighting system can be folded such that the low-beam light source will keep away from the high-beam light source in space based on practical implementations. This offers design flexibility, outstanding heat dissipation feasibility and less color non-uniformity.

With continued reference to FIG. 7, the low-beam primary optics 71L, i.e., the low beam reflector, comprises a reflective light in-coupling surface 71LS, and the highbeam primary optics 71H, i.e., the high beam collimator, comprises a refractive light in-coupling surface 71HS. It should be noted that, although a reflective light in-coupling surface 71LS is only described in connection with the low-beam primary optics 71L, the present invention should be never limited to it. In other words, the high-beam primary optics 71H may also comprise a reflective (not refractive) light in-coupling surface, which will be described in detail with reference to the following FIG. 8 and/or FIG. 9. In a similar way, although a refractive light in-coupling surface 71HS is described here in FIG. 7 with reference to the high-beam primary optics 71H, the present invention should be never limited to it. This means that in a different embodiment, the low-beam primary optics 71L may also comprise a refractive (not reflective) light in-coupling surface, which will be detailed with reference to FIG. 9 in the following.

Figure 8:
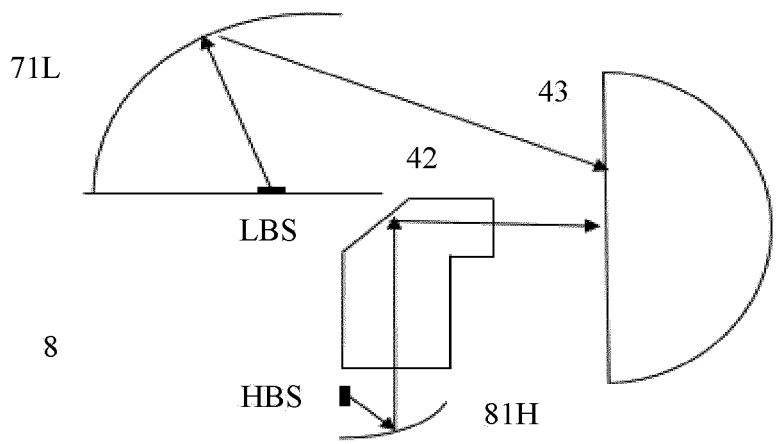
FIG. 8 schematically illustrates a front-lighting system for a vehicle according to a further embodiment of the present invention, where the front-lighting system comprises a low-beam reflector and a highbeam reflector.

FIG. 8 schematically illustrates an alternative front-lighting system 8 for a vehicle according to a further embodiment of the present invention. Components and their arrangement in FIG. 8 basically remain the same as that in FIG. 4 and FIG. 7, and thus the same reference numerals are used to indicate the same components, such as the low-beam primary optics 71L (specifically, the first or low-beam primary reflector), the transparent shutter 42, the secondary optics 43, the low-beam light source LBS and the high-beam light source HBS. In addition to these same components, the high-beam primary optics in the front-lighting system 8 of FIG. 8 now comprises a second reflector 81H, not a collimator. The second reflector 81H comprises a reflective light in-coupling surface, and is configured to reflect the light emitted from the high-beam light source HBS towards the transparent shutter 42. That is to say, the emitted light from the high-beam light source HBS is firstly reflected by the second reflector 81H, and then enters the transparent shutter 42. In this way, the high-beam light source HBS can be positioned even further away from the low-beam light source LBS, which makes the heat dissipation even better. This large spacing between the high-beam light source HBS and the low-beam light source LBS is clearly shown in FIG. 8.

Figure 9:
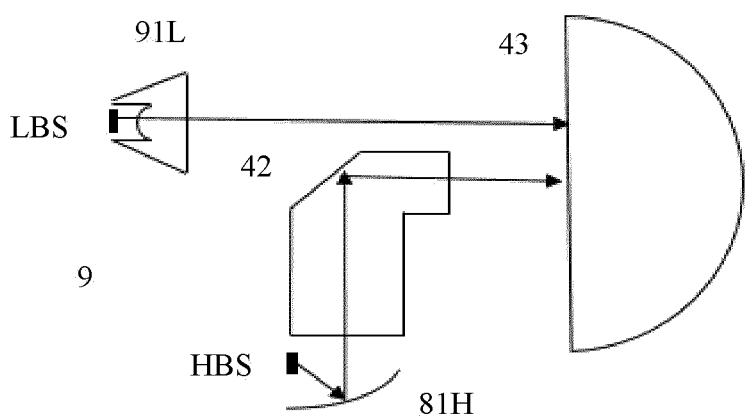
FIG. 9 schematically illustrates a front-lighting system for a vehicle according to yet another embodiment of the present invention, where the front-lighting system comprises a low-beam collimator and a high-beam reflector.

FIG. 9 schematically illustrates another alternative front-lighting system 9 for a vehicle according to an embodiment of the present invention. The front-lighting system 9 here in FIG. 9 is almost the same as that in FIG. 8. Thus, the same reference numerals are used to indicate the same components, such as the transparent shutter 42, the secondary optics 43, the second reflector 81H, the low-beam light source LBS and the high-beam light source HBS. The only difference between FIG. 9 and FIG. 8 is in the low-beam primary optics, which is now designed to be a first collimator 91L, not a first reflector. This means that the first collimator 91L comprises a refractive light in-coupling surface, not a reflective one as that in the first reflector 71L (see FIG. 7 and FIG. 8). In case the low-beam primary optics is chosen as a first collimator 91L, not only a projection of light from the low-beam light source LBS onto the transparent shutter 42 and the secondary optics 43 can be achieved, but also a beam shaping of this same light will be obtained.

Figure 10:
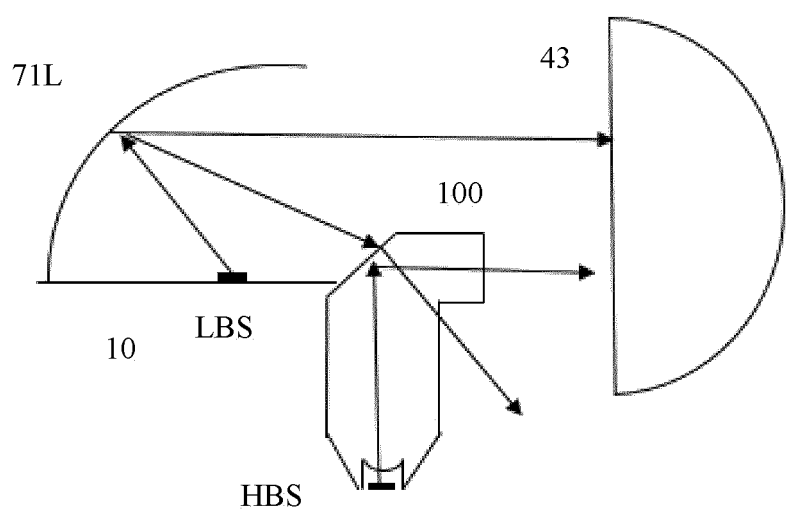
FIG. 10 schematically illustrates a front-lighting system for a vehicle according to still another embodiment of the present invention, where the transparent shutter and the high-beam collimator are integrated in the front-lighting system.

FIG. 10 schematically illustrates a front-lighting system 10 for a vehicle according to a further embodiment of the present invention. The front-lighting system 10 in FIG. 10 basically stays the same as that in FIG. 7. Thus, the same reference numerals are used to indicate the same components, such as the low-beam primary optics 71L (i.e., the first reflector), the secondary optics 43, the low-beam light source LBS and the high-beam light source HBS. The difference between FIG. 10 and FIG. 7 lies in the transparent shutter and the high-beam primary optics. Specifically, the high-beam primary optics here in FIG. 10 forms a collimating portion of the transparent shutter. That is to say, the transparent shutter and the second collimator are integrated together, and thus form a one-piece component 100. The collimating portion of the integral component 100 here is specifically arranged for collimating the light emitted from the high-beam light source HBS towards the shutter portion thereof. Similarly to the first collimator 91L (see FIG. 9), a beam shaping of the high-beam light rays can be obtained in this way. Different from the case in FIG. 4, this beam shaping of the light emitted from the high-beam light source HBS occurs inside the one-piece component 100, which may be beneficial for quality improvements of the highbeam light rays.

It is important to note that light rays shown in the figures, only represent part, but not all, of the light rays within the whole optical system. Especially, with reference to FIGS. 7-9, light rays emitted from the low-beam light source LBS and projected by the low-beam primary optics 411 (i.e., the first reflector 71L or the first collimator 91L) onto the transparent shutter 42 are not explicitly depicted, so as to not obscure the drawings. However, this definitely should not be constructed to imply that this portion of light rays does not exist. On the contrary, the light rays shown in all the drawings are only used as representative examples for a purpose of illustrating the basic principle of the present invention, and clearly should not be read as exhaustive examples of all the light rays within the entire system.

With regard to the materials and manufacturing or processing processes suitable for the transparent shutter 42, different options can be used. For example, in an embodiment, the transparent shutter 42 can be fabricated by injection molding as a single plastic component. Apparently, materials other than plastic and processes other than injection molding can also be utilized based on specific situations, and the present invention is not limited in this aspect.

In should be noted that although the transparent shutter 42 is shown in sectional views in all the drawings of the present invention and seems to be a flat plate, the actual 3D shape of the transparent shutter 42 might be rather complicated. In some embodiments, the transparent shutter 42 can be designed to have a flat shape. Alternatively, in other embodiments, the transparent shutter 42 can be designed as a curved body, maybe of a freeform shape. Specific illustrations about different shapes of the shutter, both in the drawings and the specification, should not be interpreted to be limiting, but rather are to be considered as exemplary disclosures.

It should also be noted that the above-mentioned embodiments illustrate rather than limit the present invention, and that those skilled in the art will be able to design many alternative embodiments without departing from the scope and spirit of the present invention. Although the present invention has been described in connection with some embodiments, it is not intended to be limited to the specific forms as set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention.

Furthermore, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate.

In the claims, any reference signs placed between parentheses shall not be construed as limiting the claims. Use of the verb "comprise" and its conjugations does not exclude the presence of elements or steps other than those stated in a claim. The article "a" or "an" preceding an element does not exclude the presence of a plurality of such elements. Also, references to first, second etc. are merely to be considered as labels and do not imply or describe any ordering, sequence, relation or properties of the features prefixed by these terms.

The present invention may be implemented by hardware comprising several distinct elements. In the device claims enumerating several means, several of these means may be embodied by one and the same item of hardware. The mere fact that certain measures are recited in mutually different dependent claims does not indicate that a combination of these measures cannot be used to advantage.

LIST OF REFERENCE NUMERALS 1 front-lighting system
11 LED
12 reflector
13 projection lens
14 moveable shutter
2 front-lighting system
21, 22 reflector
23 holder
24 fixed shutter
DA dark area
4 front-lighting system
BS1 first light source
BS2 second light source
411 first primary optics
412 second primary optics
42 transparent shutter
421 flat or freeform surface
422 flat or freeform light out-coupling surface
423 micro-optical surfaces
43 secondary optics
7 front-lighting system
LBS low-beam light source
HBS high-beam light source
71L low-beam primary optics
71LS reflective light in-coupling surface
71H high-beam primary optics
71HS refractive light in-coupling surface
72 transparent shutter
8 front-lighting system
81H second reflector
9 front-lighting system
91L first collimator
10 front-lighting system
100 one-piece or integral component

The invention claimed is:

1. A front-lighting system for a vehicle, comprising:
a first light source, a second light source, a transparent shutter, and a secondary optics,
a first primary optics arranged to receive light from the first light source and project it onto the transparent shutter and the secondary optics, the secondary optics arranged to receive light from the first primary optics and the transparent shutter and project it onto a road in front of the vehicle, and
a second primary optics arranged to receive light from the second light source and project it onto the transparent shutter, the transparent shutter arranged to receive light from the first light source via the first primary optics and prevent a lower part of it from entering the secondary optics, the transparent shutter further arranged to receive light from the second light source via the second primary optics and project it onto the secondary optics, the transparent shutter comprising:
a flat or freeform light out-coupling surface, and
one surface that comprises micro-optical structures, borders the light out-coupling surface, and is arranged to refract towards the secondary optics at least part of the light received by the transparent shutter from one or both of the first light source and the second light source which part of the light otherwise without the micro-optical structures would be totally internally reflected by a corresponding flat surface bordering the light out-coupling surface and would not reach the secondary optics.

2. The front-lighting system according to claim 1, wherein
the first light source comprises a low-beam light source, and
the second light source comprises a high-beam light source.

3. The front-lighting system according to claim 1, wherein the transparent shutter is further designed to refract the lower part of the light received from the first light source via the first primary optics away from the secondary optics.

4. The front-lighting system according to claim 1, wherein the transparent shutter is further designed to project the light received from the second light source via the second primary optics onto the secondary optics through total internal reflection.

5. The front-lighting system according to claim 1, wherein the first light source is placed in a first focal plane of the first primary optics.

6. The front-lighting system according to claim 1, wherein the second light source is placed in a first focal plane of the second primary optics.

7. The front-lighting system according to claim 1, wherein the transparent shutter is placed in one or more of: a second focal plane of the first primary optics, a second focal plane of the second primary optics, and a focal plane of the secondary optics.

8. The front-lighting system according to claim 1, wherein the first light source and the second light source are arranged at a distance larger than 20 mm from each other in the front-lighting system.

9. The front-lighting system according to claim 8, wherein the first light source and the second light source, when mounted in the vehicle, are spaced further apart in a horizontal direction than in a vertical direction.

10. The front-lighting system according to claim 1, wherein
the first primary optics comprises a first reflector or a first collimator.

11. The front-lighting system according to claim 1, wherein
the second primary optics comprises a second reflector or a second collimator.

12. The front-lighting system according to claim 1, wherein the second primary optics is integrated with the transparent shutter.

13. The front-lighting system according to claim 1, wherein at least one of the first primary optics and the second primary optics comprises a reflective light in-coupling surface or a refractive light in-coupling surface.

14. The front-lighting system according to claim 1, wherein the transparent shutter comprises a flat or freeform surface where light from the first light source and light from the second light source are incident on opposite sides thereof.

\* \* \* \* \*